March 1, 1932. A. GIGER 1,847,956
METHOD OF SHARP FREEZING FOODSTUFFS AND MEANS THEREFOR
Filed Aug. 13, 1929 2 Sheets-Sheet 1
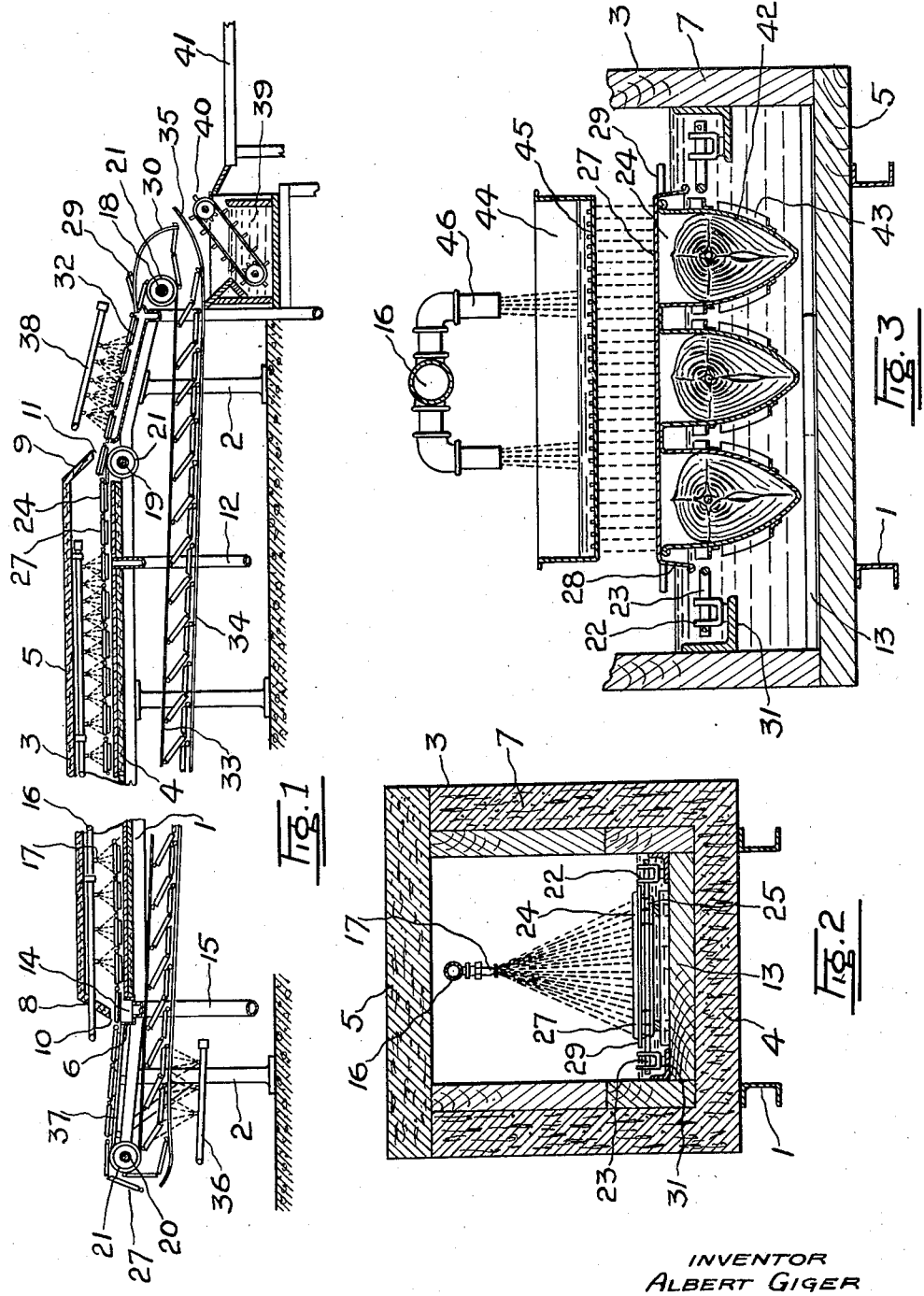
INVENTOR
ALBERT GIGER
BY
ATTORNEYS March 1, 1932.  A. GIGER  1,847,956
METHOD OF SHARP FREEZING FOODSTUFFS AND MEANS THEREFOR
Filed Aug. 13, 1929  2 Sheets-Sheet 2
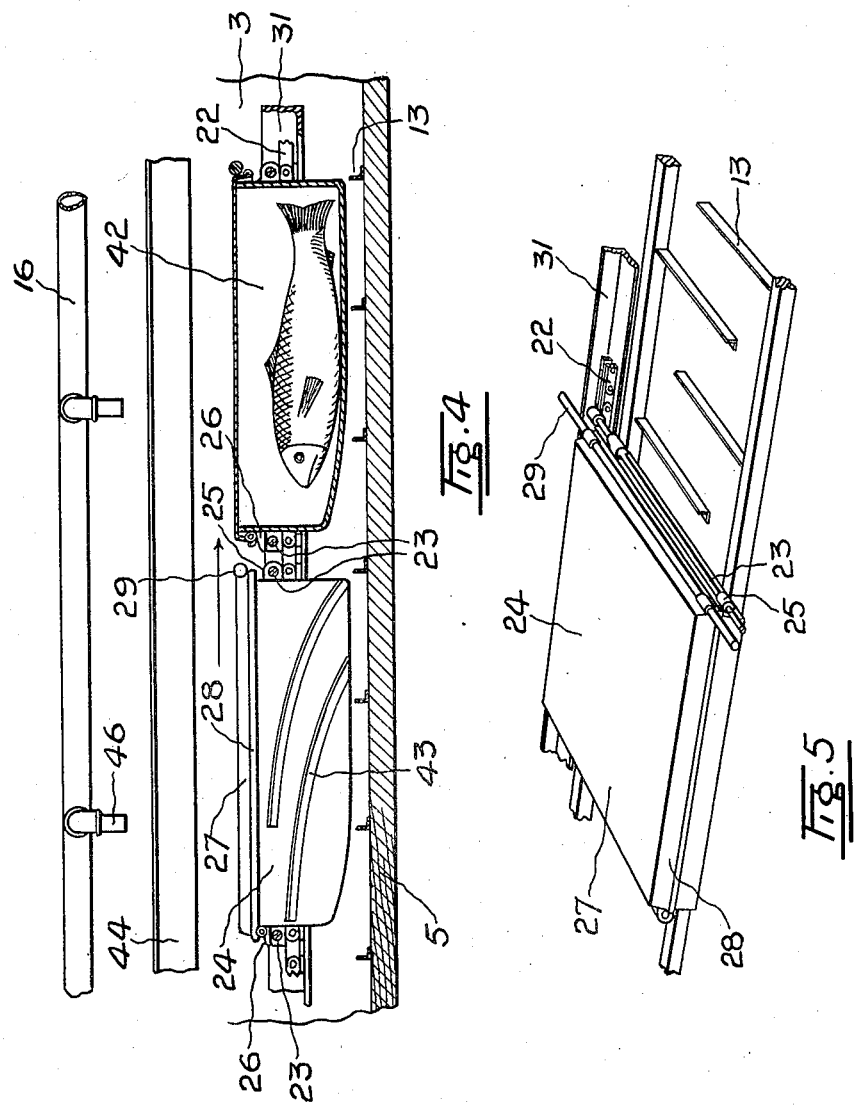
INVENTOR
ALBERT GIGER
BY
ATTORNEYS Patented Mar. 1, 1932

1,847,956

UNITED STATES PATENT OFFICE

ALBERT GIGER, OF VANCOUVER, BRITISH COLUMBIA, CANADA

METHOD OF SHARP FREEZING FOODSTUFFS AND MEANS THEREFOR

Application filed August 13, 1929. Serial No 385,587.

My invention relates to improvements in the method of sharp freezing foodstuffs and means therefor, which are particularly adapted for the sharp freezing and glazing of fish in whole or in steaks or the chilling of soft fruits and the like.

The objects of the invention are to provide means whereby foods may by a continuous process be passed through a low temperature zone in which the temperature is decreased progressively from the entrance to the outlet end of said zone; to provide for the automatic discharge of the food after passing through said zone and for its automatic immersion in water when desired subsequent to its passage through the chilling zone.

The invention consists essentially of an endless conveyor carrying a plurality of covered pans through an inclined refrigerator chamber against a flow of brine and a device for removing the covers and inverting the pans to discharge their contents subsequent to their exit from the chamber, as will be more fully described in the following specification and shown in the accompanying drawings, in which:—

Fig. 1 is a longitudinal sectional view of the machine.

Fig. 2 is a cross sectional view of the refrigerating chamber.

Fig. 3 is a sectional view showing a modification of the brine spraying system adapted for use when freezing whole fish.

Fig. 4 is a longitudinal view of the preferred pan adapted for the freezing of whole fish, showing one pan in section.

Fig. 5 is a general view showing the riffles in the bottom wall of the refrigerating chamber.

In the drawings like characters of reference indicate corresponding parts in each figure.

The numeral 1 indicates generally an elongated frame having legs 2, upon which frame a refrigerating chamber generally indicated by the numeral 3 is carried. The refrigerating chamber 3 consists of a heavily insulated elongated body having inclined bottom and top walls 4 and 5 respectively, a lower end wall 6, side walls 7 and end curtain walls 8 and 9 which extend downwards from the top wall to define an entrance and an exit 10 and 11 respectively. Adjacent the exit 11 a brine pipe 12 is fitted which is adapted to deliver brine of a suitable temperature to the upper end of the chamber 3, which brine flows slowly downwards being obstructed in its flow by staggered riffles 13 extending transversely of the bottom wall 5 "see Fig. 5" and is finally collected by a trough 14 which communicates with a further brine pipe 15 leading back to a refrigerating machine. The slope of the bottom wall 4 and the flow of brine through the pipe 12 is such that a substantially even depth of liquid is maintained.

Supported from the top wall 5 of the chamber 3 is a further brine pipe 16 supplied from a suitable source, which is fitted with a plurality of spray nozzles 17 throughout its enclosed length. The nozzles at the upper end of the chamber are closer together than those at the lower end so that a greater cooling will be derived from the brine as the food is conveyed towards the upper or delivery end of the chamber.

Suitably journalled from the frame 1 are transverse shafts 18, 19 and 20 having pairs of chain sprockets 21 and one or more of said shafts is driven from a source of power. The pairs of sprockets 21 are connected together by a pair of conveyor chains 22 which are coupled together by transversely spaced rods 23 "see Figures 2 and 3", the purpose of which will hereinafter appear.

The numeral 24 indicates a plurality of pans of shallow form for freezing fillets or any other desired form, such as shown in Figure 3, for the reception of whole fish, each of which pans are fitted on their forward ends with lugs 25 apertured to receive some of the transverse rods 23 by which they are drawn along by the conveyor chains 22 through the chamber 3 and back thereunder in inverted position to and around the sprockets 21. The rear end of each of the pans is fitted with projecting lugs 26 which normally rest on others of the transverse rods 23 to support the pan in a plane parallel to that of the movement of the chain conveyor when passing through the chamber. To the front upper edge of each pan 24 a cover 27 is hingedly connected, each cover being provided with a depending rim 28 of such depth as to provide an air lock to prevent the entrance of brine to the interior of the pans. The front end of each cover 27 is fitted with a transverse rod or a pair of lugs 29 which project beyond the side walls of the cover and are adapted to be engaged by a pair of downwardly curved rails 30 which are suitably supported adjacent the shaft 18. Tracks 31 are provided on opposite sides of the chamber 3 parallel to its bottom wall to support the conveyor chains and carry the pans through the flowing brine to the delivery end of the chamber, whence the inclination of the tracks is changed to a decline as at 32, which decline extends between the shafts 18 and 19. A return track 33 extends between the shaft 18 and 20 along which the pans are carried in inverted and inclined position and further return tracks 34 extend below the tracks 33, which are upturned beyond the shaft 18 as at 35 and the curved rails 30 for supporting the covers 27 as they are returned in inverted position towards the shaft 20.

The pans 24 as they pass around the shaft 20 are sprayed with cold water from supply pipes 36 and are carried onto an inclined table 37 where they are delivered with their covers open and trailing, they are filled as they pass along the filling table 37 and the covers 27 are swung over to close the pans prior to passing through the chamber 3, where they are subjected to brine from below and above of such low temperature as to freeze the food which obviously causes it to stick to the bottom of the pans. As the pans emerge from the chamber 3 they are sprayed with water from pipes 38 to raise the temperature of the metal forming the pans to above freezing point so that the adhesion between the food and the pan will be overcome. As soon as each pan starts to pass around the sprockets upon the shaft 18 the lugs 29 on the can cover follow the track of the rails 30, causing the cover to remain in a substantially horizontal position as it moves along the curved path 30 while the pan is inverted to drop its contents into a body of ice water in a vat 39 in which an endless conveyor 40 is fitted for the purpose of raising the commodity from the vat and delivering it to a table 41 from whence it is removed for storage or packing.

When it is desired to freeze whole fish such as cod or salmon, the pans are provided with a plurality of pockets 42 each capable of receiving a single fish and are of such shape as to conform substantially thereto as shown in Figure 3. Each pocket 42 is preferably provided with a plurality of curved webs 43 "see Figure 4" which are inclined in the direction of the flow of the brine, so as to cause the brine to circulate as it contacts with the sides of the pockets and to maintain an even cooling over its entire immersed surface.

In freezing whole fish it will be noted that the fish is placed in the pans in such a manner that its sides are brought together and are so held by the sides of the pan until it is frozen. By this method of closing the cleaned fish and freezing it in a substantially solid mass, the tendency of the fish to go bad at the belly is obviated and its keeping qualities are greatly enhanced.

As a modification, I may suspend a plurality of troughs 44 having a perforated bottom wall 45 transversely of the chamber 3 above the pans, which troughs would be supplied with brine from branches 46 from the pipe 16 and produce a constant and even spray of cold brine over the entire surface of the pan covers as they pass thereunder.

In the process above described the brine temperature and speed of pan movement through the chamber would be so timed according to the commodity dealt with as to freeze said commodity to such a degree that after being detached from the pan by the warming influence of the water spray from the pipe 38 and its subsequent immersion and removal from the vat 39 that it will congeal the water adhering thereto to leave it in glazed condition.

What I claim as my invention is:

1. A method of sharp freezing which consists of placing a commodity in a covered container and passing it through a body of flowing brine in which the direction of the brine is counter to the movement of the pan and of subjecting the cover to a brine spray during said passage.

2. A method of sharp freezing which consists of placing a commodity in a covered container and passing it through a body of flowing brine in which the direction of the brine is counter to the movement of the pan and of subjecting the cover to a progressively increasing quantity of brine spray during said passage.

3. A sharp freezing machine comprising a refrigerating chamber having an entrance and an outlet, an endless conveyor including a plurality of covered commodity containers passing through the chamber, means for freezing the commodity carried by the containers as they pass through the chamber, means for inverting the containers and means for simultaneously removing their covers to discharge the commodity.

4. In a sharp freezing machine having an endless conveyor supporting a plurality of commodity containers adapted to be partially immersed in a body of brine and drawn therethrough, and means upon the immersible surface of the containers for deflecting the brine upwards thereover.

5. In a sharp freezing machine having an endless conveyor arranged to pass through a refrigerating zone, a plurality of commodity containers, each comprising a pan connected to the conveyors to be drawn thereby, a cover hingedly connected to the rear end of the container, and means for simultaneously inverting the pan and removing the cover subsequent to the passage of the pan from the refrigerating zone.

6. In a sharp freezing machine having an endless conveyor arranged to pass through a refrigerating zone, a plurality of commodity containers, each comprising a pan connected to the conveyors to be drawn thereby, a cover hingedly connected to the rear end of the container, and means for simultaneously inverting the pan and removing the cover subsequent to the passage of the pan from the refrigerating zone, said means comprising a sprocket about which the pan is adapted to be drawn by the conveyor to invert it and a rail adapted to engage the forward end of the cover to maintain it in substantially normal position during the inverting of the pan.

7. A sharp freezing machine comprising an inclined refrigerating chamber having a brine inlet adjacent its upper end and a brine outlet at its lower end, a conveyor supporting a plurality of commodity containers in semi-immersed position in the brine flowing between the inlet and the outlet, and means within the chamber for retarding the flow of brine towards the outlet.

8. In a sharp freezing machine having a conveyor for moving fish to be frozen through a freezing zone, and a plurality of pans movable with the conveyor, the bottom of each of said pans being shaped to conform to the belly of a fish whereby the sides of the belly cut of a cleaned fish placed therein are held in intimate contact with each other.

Dated at Vancouver, B. C., this 5th day of August, 1929.

ALBERT GIGER.